E. B. HUGHSON.
GASOLENE TANK ATTACHMENT.
APPLICATION FILED MAY 19, 1914.
1,135,900.
Patented Apr. 13, 1915.
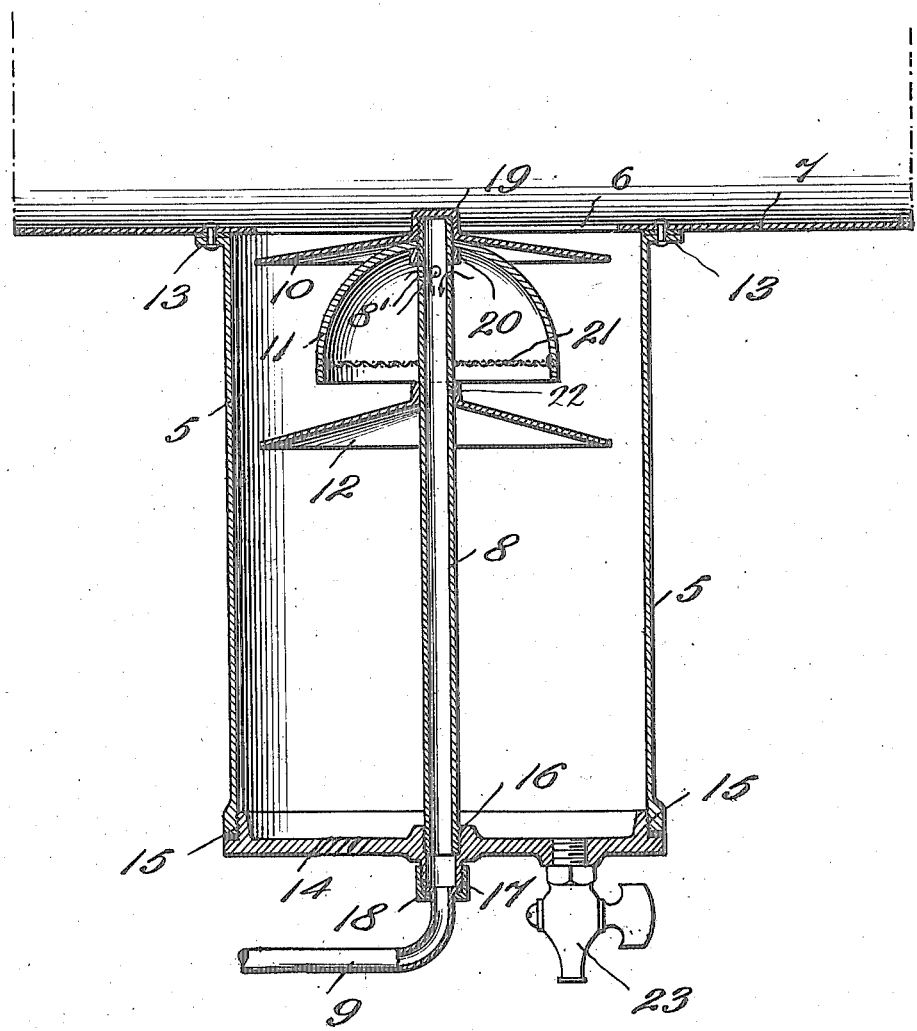

UNITED STATES PATENT OFFICE.

EDWIN B. HUGHSON, OF BRANCH, NEW YORK.

GASOLENE-TANK ATTACHMENT.

1,135,900.  Specification of Letters Patent.  Patented Apr. 13, 1915.

Application filed May 19, 1914. Serial No. 839,601.

*To all whom it may concern:*

Be it known that I, EDWIN B. HUGHSON, a citizen of the United States, residing at Branch, in the county of Ulster and State of New York, have invented new and useful Improvements in Gasolene-Tank Attachments, of which the following is a specification.

The general object of this invention is to effect the clearing of gasolene and like fuel from foreign matter such as dirt, water and the like, by inviting the latter to precipitate to a desired point whereby the same may be readily removed or drained off at will. And to these ends the invention consists of an extension positioned on a usual gasolene tank and the arrangement of a series of deflectors within the extension whereby the dirt and foreign matter contained in the gasolene may be gravitated to the bottom of the extension and thereby be drained off or otherwise removed.

Other objects will appear and be better understood from that embodiment of my invention of which the following is a specification, reference being had to the accompanying drawings forming part hereof in which the figure is a vertical sectional view of my invention arranged on a portion of a gasolene tank.

As shown in the drawings the extension here shown in the form of a cup 5 is arranged under a suitable opening 6 in the fuel tank 7, and arranged within the cup 5 is a central discharge pipe 8 which communicates with the feed pipe 9 for conveying the fuel to a motor. Mounted on the upper end of the pipe 8 is a series of deflectors 10, 11 and 12, which protect the discharge openings 8' provided in the upper end of the pipe.

The cup 5 may be made of any suitable material such as copper, brass, or the like, and for the purpose of illustration the same is shown in the drawings as cylindrical in shape, though it may be of any shape desired. The upper end of the cup is provided with an annular outwardly disposed flange 13 whereby the cup may be secured to the bottom of the tank 7 by rivets or the like, and for the purposes of preventing a leakage of fuel, a suitable packing ring is interposed between the flange 13 and the bottom of the tank as shown. The lower end of the cup is provided with a detachable end portion 14, which is secured to the cup by means of the flanged screw-threaded portion 15, and for the purpose of carrying the pipe 8, the end 14 is provided with a centrally located bored bearing 16, which has an externally screw threaded depending neck 17 as shown. The pipe 8 is detachably positioned within the bearing 16 by means of screw threads, and for the purpose of retaining the flanged end of the feed pipe 9, a bushing 18 is provided which fits over the flanged end of the pipe 9 and is screw threaded onto the neck 17 of the bearing 16, thus the pipe 8 and the passage 9 have direct communication with each other.

The pipe 8 is preferably formed of sufficient height so that the upper end of the same is appreciably adjacent to the opening 6 in the bottom of the fuel tank, thus the uppermost of the deflectors is substantially located within the opening 6 as shown. The deflector 10 is appreciably conical in shape and has its peripheral edge in spaced relation with the side of the cup 5. The deflector 10 is also provided with a centrally located socket 19, which fits over the upper end of the pipe 8, and is screw threaded thereon so as to be securely held in position. Arranged in spaced relation with the deflector 10, is a second deflector 11, which is substantially hemispherical in shape and for the purpose of being held in contact with the deflector 10, the deflector 11 is supported by a collar or ring 20 which is screw threaded onto the upper end of the pipe 8, and carried by the lower portion of the deflector 11 on the interior thereof is a screen or strainer 21, as shown. A third deflector 12 is arranged on the pipe 8 in spaced relation with the deflector 11. The deflector 12 is similar in shape and size to the deflector 10, and is secured to the pipe 8 by means of a pin 22.

Now it will be seen that the gasolene or like fuel which is carried by the tank 7, will fill the cup 5 by virtue of gravity, and by reason of having the outlet openings 8' arranged in the upper end of the pipe the fuel must be appreciably level with the openings 8' in order to pass therethrough on its way to the carbureter (not shown) by means of the pipe 9. It is quite obvious that only the upper portion of the liquid fuel in the cup will be drawn off through the holes 8', and by virtue of these holes being of small size the liquid will pass therethrough in a slow and even manner. As the fuel fills up the cup 5, the dirt and foreign matter which may be contained therein, will gravitate to the bottom of the tank by reason of differences in the specific gravity of the elements, thus the foreign matter will settle and remain in the bottom, and by reason of the clear fuel being uppermost, the latter will escape through the holes 8' as stated. A drain cock 23 is provided on the lower end 14 of the cup, by means of which the foreign matter such as dirt, water and the like may be drained off when desired. It will be noticed that the meshed wire strainer 21 is provided on the deflector 11, which augments the straining operation of the liquid and by virtue of the construction and disposition of the deflectors any foreign matter contained in the fuel will be obviously directed to the bottom of the cup.

It is obvious that those skilled in the art may vary the details of construction and arrangements of parts without departing from the spirit of my invention and therefore I do not wish to be limited to any such features except as may be required by the claim.

What I claim as new is;—

The combination with a tank having an opening at the lower portion thereof, of a cup arranged to register with the opening and secured to the tank, the said cup including a body and a detachable end portion carried by the body, a discharge pipe carried by the end portion and located within the body, and provided with openings in the vicinity of its upper end, a series of deflectors carried by the discharge pipe at the upper portion thereof, one of said deflectors closing the upper end of the pipe, another of said deflectors being secured to the pipe above the openings therein, and a screen carried by the last mentioned deflector and connected with the pipe below the opening therein.

In testimony whereof I affix my signature in presence of two witnesses.

EDWIN B. HUGHSON.

Witnesses:
M. E. LAUGHLIN,
GEO. A. BYRNE.